Sept. 2, 1941.  W. BENDER  2,254,203
METHOD AND APPARATUS FOR THE PRODUCTION OF SHEETS AND FILMS
Filed April 8, 1939  5 Sheets-Sheet 1

*William Bender* INVENTOR

Sept. 2, 1941.                W. BENDER                    2,254,203
      METHOD AND APPARATUS FOR THE PRODUCTION OF SHEETS AND FILMS
                    Filed April 8, 1939          5 Sheets-Sheet 2

William Bender  INVENTOR
BY
            ATTORNEY

Sept. 2, 1941.  W. BENDER  2,254,203
METHOD AND APPARATUS FOR THE PRODUCTION OF SHEETS AND FILMS
Filed April 8, 1939  5 Sheets-Sheet 3

William Bender INVENTOR

BY _____ ATTORNEY

Sept. 2, 1941.   W. BENDER   2,254,203
METHOD AND APPARATUS FOR THE PRODUCTION OF SHEETS AND FILMS
Filed April 8, 1939   5 Sheets-Sheet 4

$Ef_n + Ef_{n'} = Drag = -F$

Fluid propelled Zero-tension film
Film Velocity (V) = Bath Velocity ($V_n$, $V_{n'}$)

William Bender INVENTOR
BY
ATTORNEY

William Bender INVENTOR

Patented Sept. 2, 1941

2,254,203

UNITED STATES PATENT OFFICE 2,254,203

METHOD AND APPARATUS FOR THE PRODUCTION OF SHEETS AND FILMS

William Bender, Buffalo, N. Y., assignor to E. I. du Pont de Nemours & Company, Wilmington, Del., a corporation of Delaware Application April 8, 1939, Serial No. 266,772

24 Claims. (Cl. 18—15)

This invention relates to the production of sheets and films from film-forming compositions which are coagulable in a liquid coagulating bath. More particularly, this invention relates to a process and apparatus for the extrusion of a film-forming composition, in the form of a sheet, into a moving, coagulating and/or regenerating bath, and forwarding, or propelling, said sheet by means of said moving bath whereby to form said sheet while imparting thereto a minimum amount of tension.

The following description of the invention is directed specifically to the production of sheets of regenerated cellulose from viscose; however, the invention is applicable to the production of sheets from any flowable film-forming composition which is coagulable in a liquid coagulating bath, for example, regenerated cellulose sheets from cuprammonium cellulose solutions, cellulose derivative sheets from cellulose derivative compositions coagulable in a coagulating bath.

In the conventional process for the production of regenerated cellulose sheets from viscose, the viscose is continuously extruded into a coagulating or a coagulating and regenerating bath. The coagulated sheet is drawn through the coagulating and regenerating baths by means of positively driven rollers. The coagulated and regenerated sheet is continuously forwarded, or propelled, by means of positively driven rollers, through a considerable number of treating and purification baths whereby to desulfur, bleach, wash, and impregnate the sheet with softeners and often sizes and other finishes.

In another method for the production of sheets from film-forming compositions the liquid sheet is deposited upon the surface of a highly polished moving drum or belt. Generally, after the sheet or film has become partially coagulated and/or regenerated by contact with a coagulating and/or regenerating bath, it is stripped from the drum or belt and drawn through a plurality of coagulating and purification baths as in the first instance.

It will be observed that in both of the previously known methods for the production of sheets or films from film-forming solutions, they are subjected to two tension forces. The first force is that required to draw the film through the treatment baths and generally applied through the supporting rolls which are power driven. The second force is applied in a lateral direction across the width of the sheet, and is occasioned by the friction between the web and the supporting rolls, if and when the film is shrinking or expanding transversely to the direction of propulsion through the machine. When sheets or films are moved through liquids by means of forwarding and supporting rolls, there will also be transmitted to the film a tension between forwarding rolls when considerable shrinkage of the film takes place.

In the present state of the art of producing regenerated cellulose sheeting from viscose, there is an abundance of evidence showing that the viscose itself lacks uniformity. The rate of shrinking of gel structures formed therefrom during the early stages of processing is non-uniform, and non-reproducible, even when great precautions are observed in the preparation and handling of the viscose. It has been observed, for instance, that the percentage of free shrinkage in the direction of film propulsion at a given region on the ordinary sheet casting machine (used in the preparation of regenerated cellulose sheeting) may vary as much as 20% in the course of a few hours with apparently no changes in the usually controlled variables in either the preparation of viscose or in the manipulation of the film- or sheet-forming machinery. It is obviously a very difficult thing to so control the several peripheral speeds of the numerous supporting rolls found in the usual casting machine so as to adequately accommodate these considerable changes in the shrinkage characteristics of the web. Unless the speed of the forwarding rolls can be made to automatically vary with the varying shrinking characteristics of the regenerating sheet, the sheet may be distorted by excessive tensions or marred by laps, wrinkles, etc., due to excessive slack.

Aside from the disadvantages resulting from restraining influences upon the film, there are others resulting from these modes of operation. A machine for the production of such film is a very large and cumbersome affair. In the present type of casting machine, a great many rolls are required to support and forward the film through these treatment tanks, whence it becomes an exacting and tedious task to start a fresh end of the film through the machine, should a break occur or should a machine be started up after a shut-down. The present invention will obviate this inconvenience to a great extent. The machines now in use require a large floor area; the machine of the present invention will require a great deal less floor area. Furthermore, because of the large number of driving rolls, the present machines require a complicated drive system and consume a large amount of power which will be materially diminished by the use of the machine of the present invention.

It is, therefore, an object of this invention to provide an improved process for the production of sheets and films from film-forming solutions which can be coagulated in a coagulating bath.

It is another object of this invention to provide a process for the production of sheets and films from film-forming solutions in which the film, during the coagulation and/or regeneration thereof, is forwarded through a coagulation and/or regeneration bath with little or no excessive tension or slack.

It is a further object to provide apparatus for the production of such sheets or films which shall minimize the tension or slack imparted thereto during its contact with a coagulation or regeneration bath.

It is a further object to produce film of regenerated cellulose having improved characteristics.

It is a further object to produce transparent regenerated cellulose film with improved durability.

It is a further object to produce transparent regenerated cellulose film with improved sticking resistance.

It is a further object to produce transparent regenerated cellulose film with improved point-to-point uniformity.

It is a further object to produce transparent regenerated cellulose film with improved permanent shrinkage characteristics.

It is a further object to produce transparent regenerated cellulose film with improved properties at higher speeds of casting than heretofore possible.

Other objects will appear hereinafter.

In general, the objects of the invention are accomplished by extruding a film- or sheet-forming solution directly into contact with a moving coagulating and/or regenerating bath, which is at least the width of the extruded solution and which, furthermore, is traveling at a rate which is approximately that of extrusion of the cellulosic solution such that the cellulosic film during coagulation and/or regeneration is carried away from the extrusion nozzle concurrently with the coagulating and/or regenerating solution, and consequently supported in the coagulating and/or regenerating liquor by buoyant forces and transported by vanishingly small skin friction forces of the bath fluid. Under these conditions the film may be processed under transport in a practically stress-free condition.

The details of the invention will be more clearly apparent by reference to the following detailed description when taken in connection with the accompanying illustrations of several illustrative modifications of apparatus constructed in accordance with the invention.

Figures 4, 5, 6, and 7 are diagrammatic, illustrative views showing the forces which are applied to sheets or films during the coagulation and treatment thereof.

Figure 8:
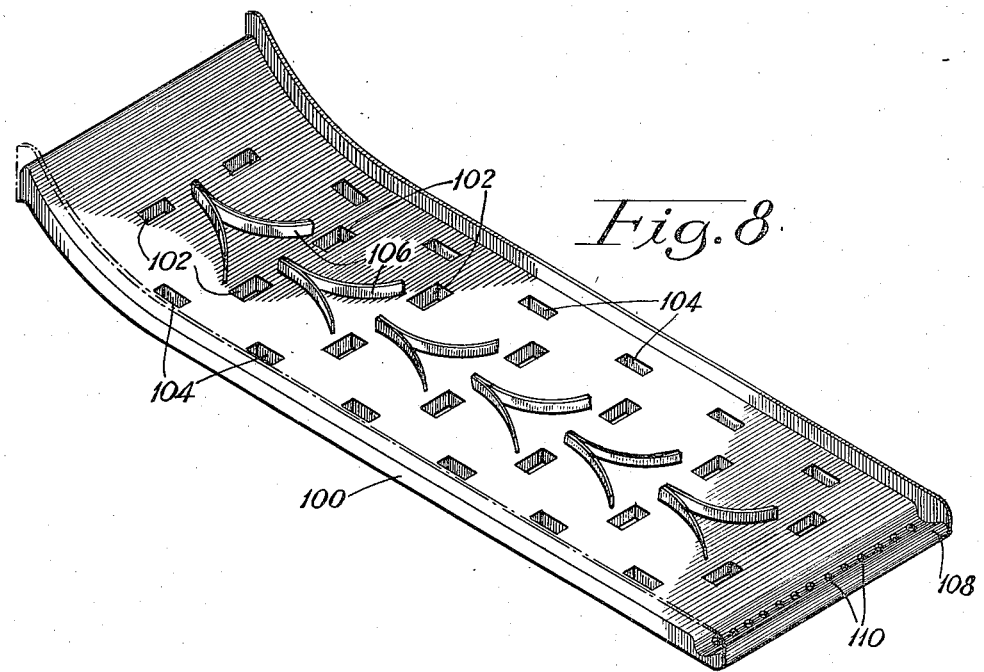

Figure 8 is a perspective view of another modified form of coagulating bath or treatment bath tray for use in accordance with the invention.

Figure 9:
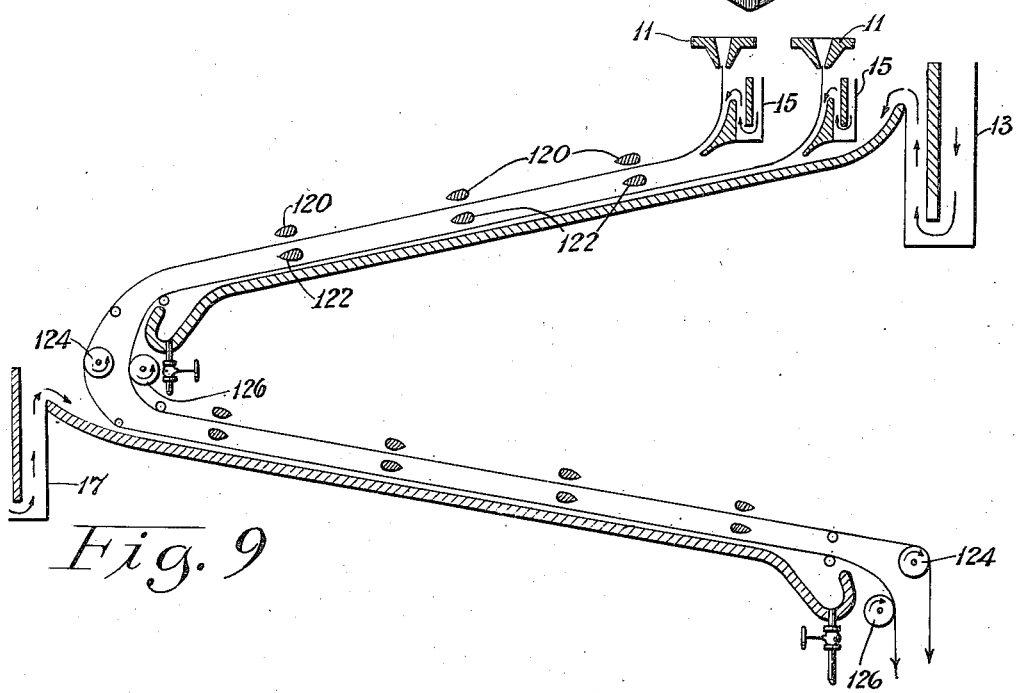

Figure 9 is a diagrammatic, side-elevational view of still another modified form of device for use in the simultaneous casting and coagulation of a plurality of sheets or films.

Figure 1:
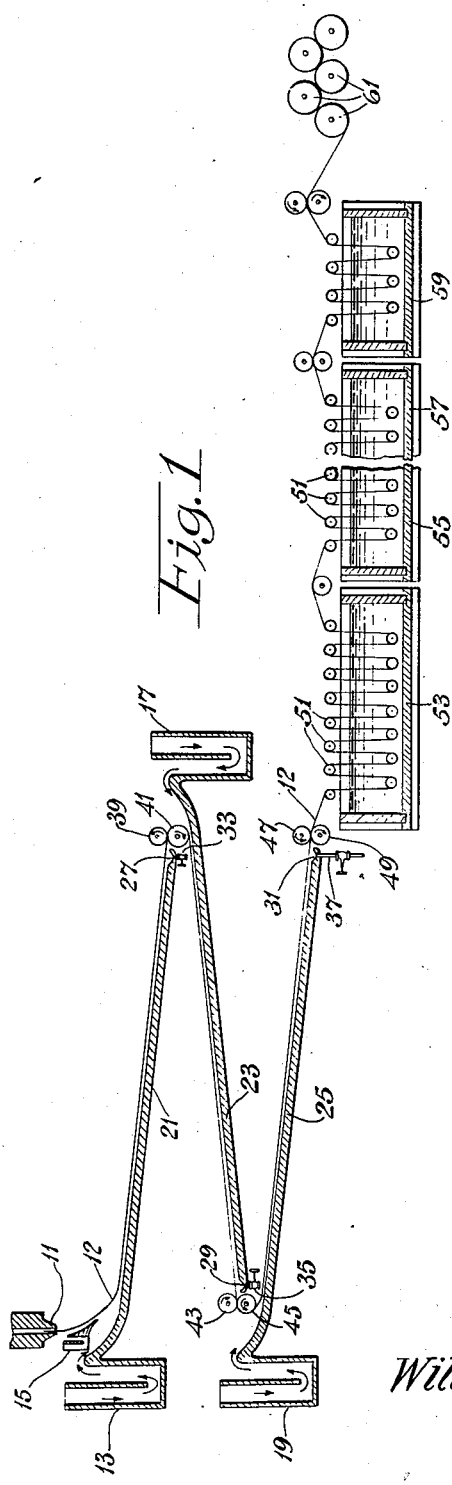
Figure 1 is a diagrammatic, side-elevational view of one form of apparatus constructed in accordance with the principles of the invention.

Referring to Figure 1 of the drawings, reference numeral 11 designates an extrusion hopper, 12 a sheet or film extruded from the hopper, 13, 15, 17 and 19 laminar flow bath feeding troughs for the coagulation and/or regeneration baths, 21, 23 and 25 downwardly declined trays for the baths, 27, 29 and 31 liquid withdrawal channels and 33, 35 and 37 outlet conduits for the treatment baths. Sets of squeeze rolls 39, 41; 43, 45 and 47, 49 are provided at the ends of the downwardly declined trays. Numerals 53, 55, 57 and 59 refer to successive treatment tanks, 51 to supporting and forwarding rolls, and 61 to drying rolls.

The apparatus shown in Figure 1 operates in the following manner:

The extrusion hopper 11 is continuously supplied, from any desired source, with a sheet- or film-forming solution, for example, viscose containing 7.5% of cellulose and 6.4% of sodium hydroxide. The viscose is extruded through a long narrow slot in the bottom of the hopper to form a sheet or film 12. The hopper slot may, for example, have a width such that the thickness of the resulting dried film will be approximately 0.0009 of an inch. The length of the slot may be such as to produce a film having a width of approximately 82 inches. The rate of extrusion may be varied within wide limits, say, from 20 meters per minute up to 100 meters per minute, or even greater speeds. The sheet 12 flows downwardly into tangential contact with a coagulating and/or regenerating liquid flowing from auxiliary feeding trough 15. The coagulating liquid and the film 12 pass into the coagulating and/or regenerating liquid flowing down the declined tray 21 and which has its source from laminar flow feed trough 13. The coagulating fluid forms a layer upon the bottom of the tray 21, which layer, in general, is thick enough to envelop the film of viscose and to support it out of contact with the surface of the tray. The velocity of the bath flowing in tray 21 is determined by the initial velocity and the angle of declination of the tray and also, to a slight extent, by the volume of flow of the bath. The flow velocity of the bath should be so regulated that it is equal to or slightly exceeds the velocity of the extruded film 12 so that the coagulating cellulose sheeting will be carried away as rapidly as it is extruded from the hopper. The bath, which flows in tray 21, is collected in withdrawal channel 27 and is withdrawn from channel 27 through outlet conduit 33. The sheet 12 which is now at least partially coagulated is passed between squeeze rolls 39 and 41, around squeeze roll 41 and down the second declined tray 23 into which a coagulating and/or regenerated liquid is passed from laminar flow feed trough 17. In passing from tray 21 to tray 23, the upper and lower surfaces of the film will be reversed so that more uniform treatment of the film will result. The peripheral speed of the squeeze rolls 39 and 41 is so regulated that it corresponds with the speed of the travel of the film at this point. The squeeze rolls serve to remove from the surface of the film most of the treating liquid from tray 21.

The sheet or film passes down the trays 23 and 25 in the same manner as above described with reference to tray 21, the speed of the various parts and the supply of the coagulating and/or regenerating baths being regulated in the manner set forth above. After being completely coagulated and/or regenerated in the trays, the film 12 is passed through treatment and purification baths 53, 55, 57 and 59 in the manner diagrammatically illustrated and well known in the arts. The finally purified and properly softened film is passed around successive heated drying rolls 61 and ultimately wound into a mill roll.

In this modification of the invention the film 12, during the coagulation and/or regeneration thereof; that is, until it is completely set up, is carried along in a flowing bath with substantial elimination of tension.

Figure 2:
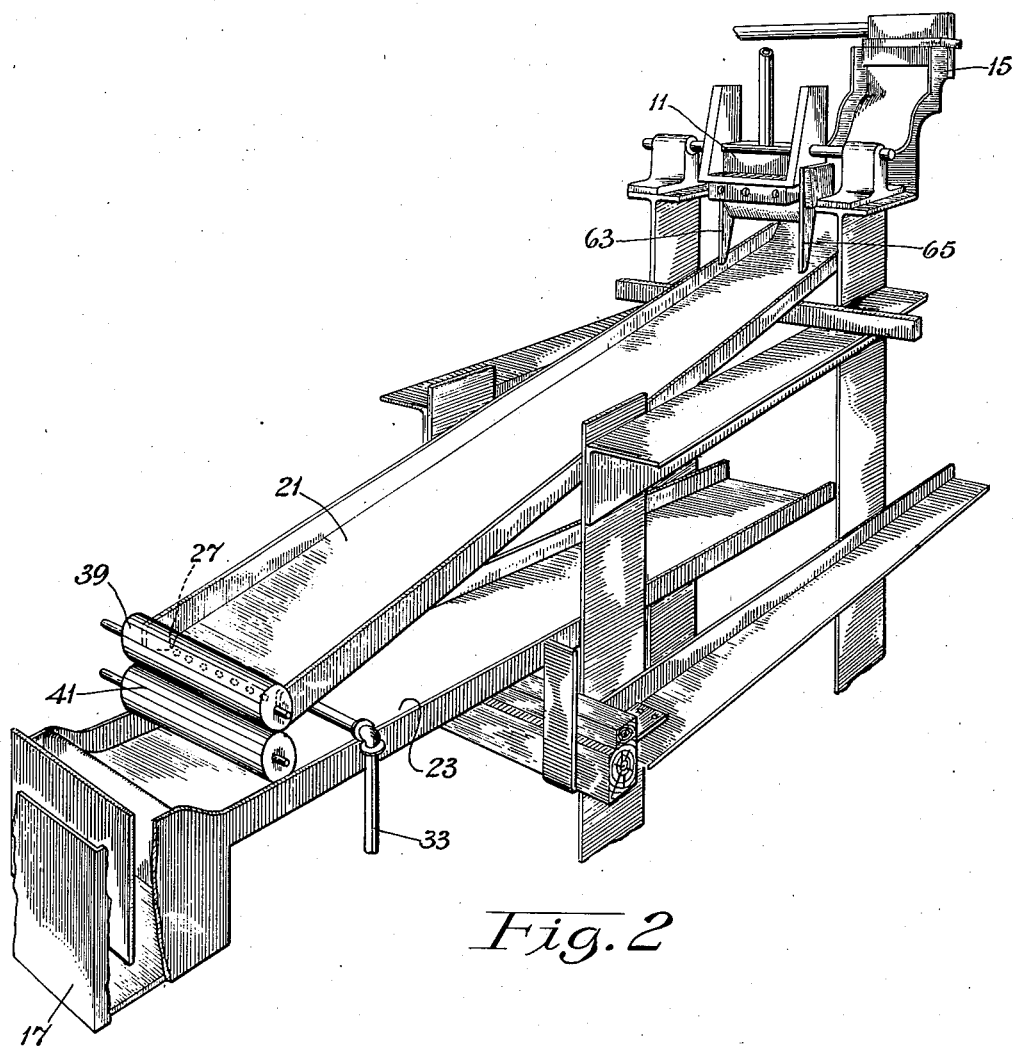
Figure 2 is a perspective view showing in greater detail a portion of the apparatus shown in Figure 1.

Figure 2 of the drawings illustrates in greater detail, a film extrusion hopper 11 and the first two downwardly declined treatment trays 21 and 23 of an apparatus as shown in Figure 1. Although a conventional form of film extrusion hopper is operative for the purposes of this invention, it is desired, and of distinct advantage, to provide the hopper 11 with two downwardly projecting members 63 and 65 at the extreme ends of the extrusion slot. The members 63 and 65 are preferably substantially parallel to each other and project down into the moving coagulating bath in tray 21. These members function by inter-facial tension to hold the extruded sheet or film to its proper width until it contacts the coagulating medium. The film as it is extruded is, of course, in an extremely fluid condition and subject, therefore, to the contractual effect of surface forces. In a typical example, it will be found that, due to the inter-molecular forces such as those of surface tension, the sheet narrows down as it flows from the extrusion slot to the bath at the average rate of about 0.6 of an inch per inch of flow on one side; that is, a total of 1.2 inches per inch of flow across the entire width of the sheet. By use of the substantially parallel projecting members 63 and 65 this contractual effect of surface tension is eliminated. It is possible to flare outwardly the members 63 and 65 so as to increase the width of the viscose film.

Figure 3:
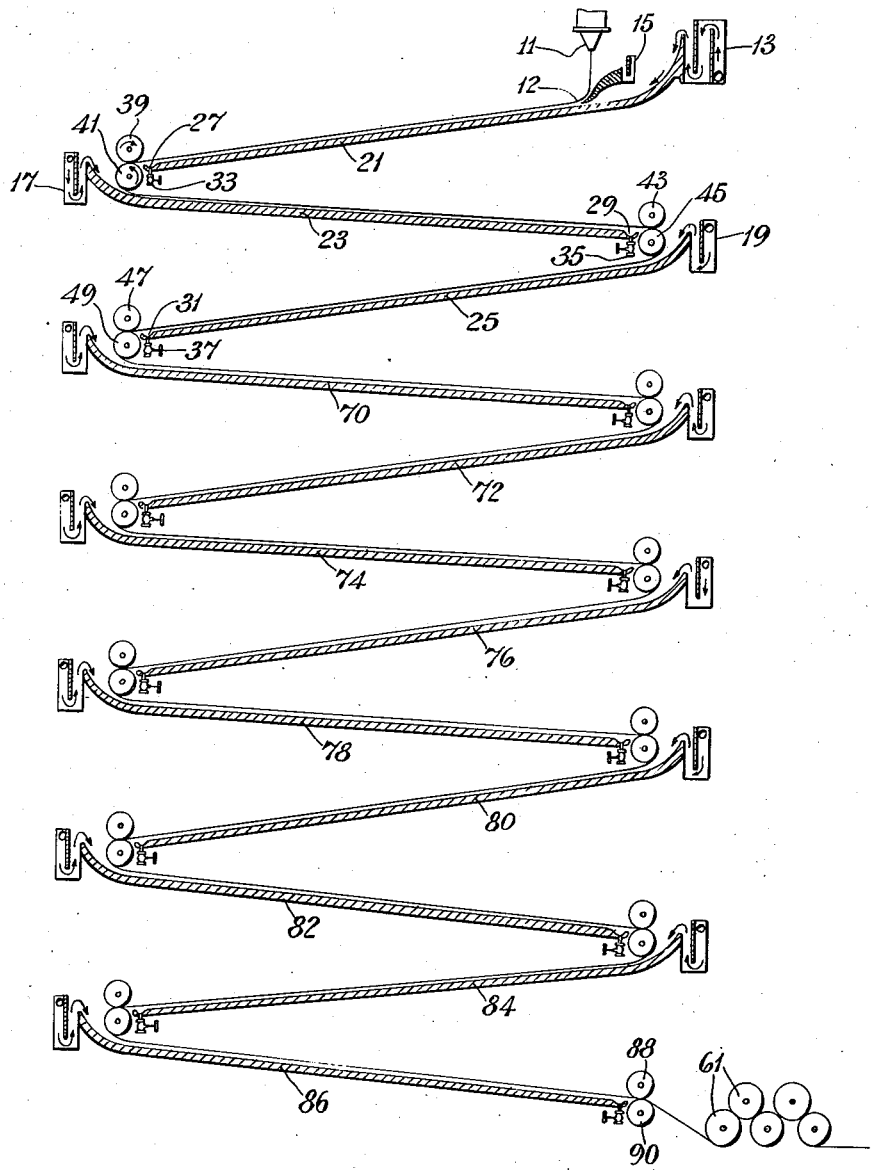
Figure 3 is a diagrammatic, side-elevational view of a modified form of apparatus suitable for use in accordance with the invention.

The modified form of device shown in Figure 3 comprises coagulating and/or regenerating trays in which the film is forwarded by means of the baths in the same manner as in the structure shown in Figures 1 and 2. In this form of device, however, the various treating and purification baths are caused to flow in downwardly directed trays 70, 72, 74, 76, 78, 80, 82, 84 and 86 in the same manner as the coagulation and regeneration baths. After flowing down the sizing and softening bath tray, the film passes through squeeze rolls 88 and 90 and then over suitable drier rolls 61.

By means of this form of apparatus there will be a substantial elimination of tension on the film until it reaches the drier rolls. This apparatus is adapted to produce exceptionally uniform sheets and films in which there is very little evidence of preferential orientation of the micelles in any direction.

The modification of film or sheet treatment trays illustrated in Figure 8 is designed to maintain a constant strength of treatment solution along the entire length of the tray. The tray 100 is provided with a series of inlet slots 102 and outlet slots 104 for the treating solution. A series of baffles 106 are provided between the inlet slots 102 and the series of outlet slots 104. The end of the tray 100 is provided with a fluid withdrawal channel 108 in which are located a number of drain openings 110.

As the treating fluid flows down the tray 100, the proper fluid strength is maintained by draining spent fluid through slots 104 and adding fresh full-strength fluid through slots 102. The baffles function to direct the spent fluid toward slots 104. The baffles will also transmit a transverse flow to the fluid; i. e., flow toward the side walls of the tray, which is found to be desirable to prevent the formation of wrinkles and ripples in the film.

The device shown in Figure 8 may also be used when it is desired that the temperature and concentration of the bath along the length of the tray be varied. Since the film is continuously coagulating and/or regenerating as it passes down tray 100, the characteristics of the film are continually changing with the degree of coagulation and/or regeneration. It may, therefore, be desirable to vary the strength of the bath along the length of the tray or to vary the temperature of the bath at various sections of the tray. To this end, solutions of different strengths and/or different temperatures may be introduced through different sets of the inlet slots 102.

Figure 9 of the drawings illustrates, diagrammatically, a preferred form of device by means of which a plurality of sheets or films can be cast simultaneously into a single set of bath treatment trays.

A plurality of sheets and films can be cast and treated by means of the apparatus illustrated in Figures 1, 2 and 3 by the addition of a second film extruding apparatus 11 together with its adjacent overflow trough 15. It is, however, preferred to provide such an apparatus with a series of spaced bath fluid guides such as rods 120 and 122, whereby to maintain the films separated from each other. Bath fluid guides may be constructed in various forms or shapes, but essentially they comprise rigid bodies, stationary or rotating, of such geometrical section and such physical surface characteristics that a predetermined flow line pattern is set up in the neighborhood of the fluid which is passing it. In particular it may be used in connection with this invention to shape the flow lines on the surface of the bath with which the film is in contact. In this modification of apparatus the film direction is reversed by passing the same over freely rotatable guide rolls 124 and 126. These guide rolls, if desired, may be replaced by squeeze rolls as disclosed in the above-described apparatus.

The following examples are illustrative of the bath compositions and their respective temperatures which may be used in a series of successive downwardly declined trays as illustrated in Figure 3 of the drawings for the production of regenerated cellulose sheets and films. It is to be understood that the invention is not limited to the specific details of these examples.

In these examples any viscose of film-forming character may be used such as a viscose comprising 8½% cellulose and 6½% sodium hydroxide. The film-forming solutions are caused to flow down their respective trays from the overflow troughs positioned at the head of the respective trays. The treating fluids may have a sufficient volume to cover the bottom of the tray to a depth ranging from approximately ¼ inch to 2 inches. The viscose is extruded from the hopper in a sheet or film of suitable dimensions and at a speed which is approximately that of the travel of the coagulating fluid along the trays.

*Example I*

For the production of 300- and 450-gauge films for speeds up to 100 meters per minute, the various trays referred to in this example have the following inside dimensions, length 36 feet, width 7 feet 6 inches, inside depth 6 inches.

| Tray No. | Nature of process | Nature of bath | Specific example of bath composition | Illustrative variation in bath composition | Specific example of bath temperature | Illustrative variation in bath temeprature |
|---|---|---|---|---|---|---|
| | | | Percent | | °C. | °C. |
| 1 | Coagulation and regeneration. | H₂SO₄ | [1] 11 | 11% to 15% | 45 | 35-46 |
| | | Na₂SO₄ | 16 | 16% to 20% | | |
| 2 | Regeneration | Overflow from tray No. 1 | | | 35 | 30-42 |
| 3 | do | Overflow from tray No. 2 | | | 34 | 28-40 |
| 4 | Wash | Water | | | 80 | 80-100 |
| 5 | do | do | | | 90 | 80-100 |
| 6 | Desulfuring | Na₂S | 0.26 | 0.18% to 0.28% | 95 | 80-100 |
| 7 | Wash | Water | | | 34 | 30-35 |
| 8 | do | do | | | 33 | 30-35 |
| 9 | Bleaching | NaOCl | 0.35 | Available chlorine 0.30%-0.40%. | 30 | 28-33 |
| 10 | Wash | Water | | | 35 | 30-35 |
| 11 | do | do | | | 35 | 30-35 |
| 12 | do | do | | | 35 | 30-35 |
| 13 | do | do | | | 35 | 30-35 |
| 14 | Softening | Glycerol | 4.5 | 4%-5% | 50 | 50-70 |
| 15 | Sizing | Stearamide | 0.069 | 0.069%-0.080% | 32 | 30-45 |
| | | Stearic acid | 0.092 | 0.081%-0.110% | | |
| | | Silica | 0.045 | 0.040%-0.060% | | |

[1] In the case of 450-gauge film (NH₄)₂SO₄ is added to No. 1 tray bath up to a maximim concentration of 0.85%.

*Example II*

For 600-gauge films for speeds up to 70 meters per minute, trays in this example having the following inside dimensions, length 45 feet, width 7 feet 6 inches, inside depth 6 inches.

| Tray No. | Nature of process | Nature of bath | Specific example of bath composition | Illustrative variation in bath composition | Specific example of bath temperature | Illustrative variation in bath temperature |
|---|---|---|---|---|---|---|
| | | | Percent | | | °C. |
| 1 | Coagulation and regeneration | (NH₄)₂SO₄ | 0.5 | 0.3%-0.5% | 42° C | 40-50 |
| | | (NH₄)HSO₄ | 0.9 | 0.6%-0.10% | | |
| 2 | Regeneration | H₂SO₄ | 2.4 | 2.0%-3.0% | 38° C | 35-45 |
| 3 | do | H₂SO₄ | 8.5 | 8.0%-11.0% | Equilibrium from tray No. 2. | |
| 4 | Wash | Water | | | 95° C | 80-100 |
| 5 | do | do | | | 95° C | 80-100 |
| 6 | Desulfuring | Na₂S | 0.35 | 0.30%-0.5% | 90° C | 85-95 |
| 7 | Wash | Water | | | 40° C | 30-45 |
| 8 | do | do | | | 35° C | 30-35 |
| 9 | Bleaching | NaOCl | 0.8 | Available chlorine 0.60%-0.9%. | 28° C | 25-35 |
| 10 | Wash | Water | | | 40° C | 30-40 |
| 11 | do | do | | | 35° C | 30-40 |
| 12 | do | do | | | 40° C | 30-40 |
| 13 | do | do | | | 35° C | 30-40 |
| 14 | Softening | Glycerol | 5.5 | 4%-6% | 55° C | 45-70 |
| 15 | Sizing | Stearamide | 0.069 | 0.069%-0.080% | 32° C | 30-45 |
| | | Stearic acid | 0.092 | 0.081%-0.110% | | |
| | | Silica | 0.045 | 0.040%-0.060% | | |

*Example III*

In the present example film is cast from two adjacent hoppers, such as illustrated in Figure 9 of the drawings. A plurality of succeeding downwardly declined trays are used similarly as in Example I. The trays in the present instance, however, are made approximately 12 inches deep so as to accommodate two films simultaneously. The bath compositions are identical to the bath compositions disclosed in Example I.

The films are passed through the successive 15 trays and are passed through two separate banks of drying rolls and then wound in separate mill rolls. The resulting films are found to be of excellent quality with little preferential orientation of the micelles, as compared with film produced in the conventional casting machines in commercial production.

*Example IV*

In the processing of 300-gauge film at a velocity of 100 meters per minute, tray No. 1 containing a coagulating and/or regenerating fluid and having a length of approximately 72 feet is employed; the film is then passed into tray No. 2 containing a hot water wash and also having a length of approximately 72 feet; the film is then passed into tray No. 3 containing a desulfuring solution and having a length of approximately 36 feet; tray No. 4 contains a room temperature water wash. This tray has a length of approximately 72 feet. Tray No. 5 is approximately 36 feet in length and contains a bleaching solution. This is followed by two trays, Nos. 6 and 7, each having a length of approximately 72 feet and containing water at room temperature. Trays Nos. 8 and 9 are 36 feet in length and contain respectively a softening agent and a sizing solution. The various treating solutions described in Example I may be employed. In this arrangement of apparatus, the film is passed along a series of trays of considerable length and by the same token the height of the machine may thereby be materially reduced. In the use of such long trays, it may be desirable to support the film by several bath fluid guides as described above, spaced at suitable intervals along the trays. It is conceivable, for example, that in a long coagulation and/or regeneration tray, the acid concentration may be so low (starting with a lower acid concentration than is used in present No. 1 tray in Example I) at the end of the tray that the bath may be economically run to the sewer. This would eliminate the necessity for a bath buck-up system.

In the above description, particularly with reference to the specific examples, the number of baths, the composition of the film-forming material, the composition of the baths, as well as certain other specific values referred to are merely illustrative of the invention. Any number of baths may be used to accomplish the complete coagulation, regeneration, washing, purification and other desirable treatment of the films prior to drying the same. The composition of the film-forming material is only limited to such materials as may be coagulated and/or regenerated in a liquid bath. The treatment bath compositions must be such that they will coagulate and/or regenerate the film, and they may have any desired concentration.

The contour of the bottom of the trays with respect to a horizontal plane may be varied in some regular manner so that the rate of transport of the coagulant and/or regenerant and the film may be made to accommodate the several machine direction shrinkages at different points, should such critical adjustment be found desirable.

Gravitational forces are not the only ones which may be employed to maintain bath fluid motion. Various mechanical and hydromechanical devices, such as moving webs, rotary impellers, fluid jets, etc., may be used.

By the use of the apparatus of the present invention manual threading up of the machine with the film in order to start the film production operation is reduced to a minimum. It will be found that in general normal operation within a tray takes place at once upon restoration of normal conditions. The squeeze rolls or guide rolls at the ends of the respective trays may be so arranged as to transfer the film from one tray to the next automatically. Under the most unfavorable conditions for threading up, the type of machine here described lends itself very well to automatic threading devices. This is obviously a great aid in the operation of the machine since any temporary derangement will necessitate merely the removal of the damaged portion of the film as it issues and will not require the tedious operation of threading up found heretofore in the operation of casting machines. The speed of threading up may be increased very substantially over previously existing practice.

Figure 9 illustrates two films being produced simultaneously. It is obviously within the scope of the present invention to simultaneously produce three or even more films in the same manner. The limitation as to the number of films which may be produced simultaneously depends only upon practical questions of handling, depth, and flow of treating fluids.

Figure 4:
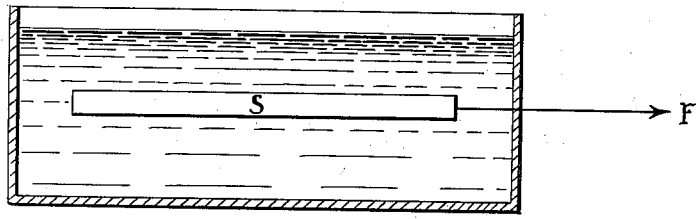
Figure 5:
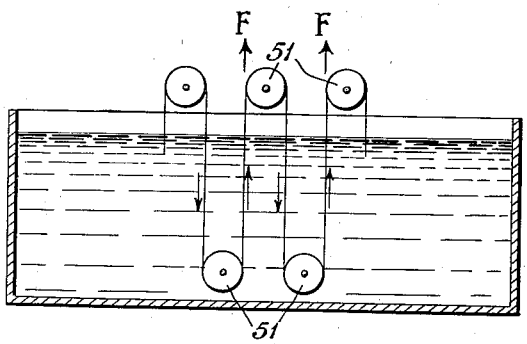

The following explanation of the principles of the invention may assist in its understanding, although it is not to be taken as a limitation in any way of the scope thereof. In attempting to move a film of coagulating and/or regenerating viscose down a casting machine without the introduction of tensile and other stresses, an important difficulty has been encountered in previous methods of film propulsion. This difficulty is illustrated by Figure 4. S is a thin sheet immersed in liquid. A force F is applied at one end. Suppose F is of such magnitude that it pulls the sheet along with a uniform velocity. This force overcomes the various types of drag on the film. The drag in question is principally the skin friction drag. Now, when the force is applied at one end, the skin friction drag reacts against the applied force F to set up a tensile stress (and strain) in the film. In previously known methods of film propulsion (see Figure 5), the friction of the film on the roll corresponds to the applied force F and the film drag reacting against this force produces a tension in the film. By this method of film propulsion, the tension in the film cannot be reduced below the existing drag.

Figure 6:
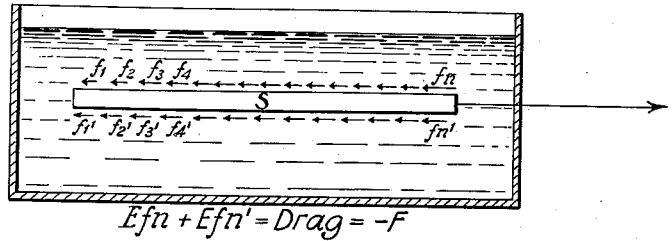

The skin friction drag is the result of a great number of small forces, each small force acting over a small area (theoretically, on the moleculs of the film surface). In Figure 6, these small forces are labeled $F_1, F_2, \ldots F_n$ and $F'_1, F'_2, \ldots F'_n$. To keep the film moving through the surrounding liquid with uniform velocity one must apply a force F equal to the sum of all the small skin friction forces. Now, if one can impress on the film a group of small forces, each applied over the small area (molecules) in question, it is possible to progressively reduce the magnitude of the individual drag forces down to zero, if desirable, or reverse them.

Figure 7:
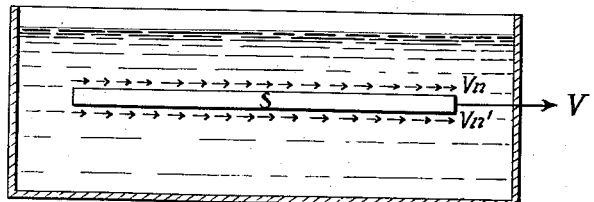

The present invention accomplishes this by making the bath fluid itself move in the direction of motion of the film. If the fluid and film velocities are made equal, the tension is reduced to zero. This is illustrated in Figure 7 of the drawings. If the fluid moves, in the direction of motion of the sheet or film, with a velocity greater than that of the film the slight tension imposed on the film will be only that due to the frictional forces of the fluid on the film. This slight tension has been found to be negligible since the tension imposed on a film by the supporting and forwarding rolls, such as is present in previously known apparatus, will be eliminated.

The use of the present apparatus and method for the production of coagulated and/or regenerated viscose film and other film produced by a coagulation and/or regeneration method has many advantages over apparatus and methods used heretofore in that a film of much greater durability, less permanent shrinkage, better surface characteristics, and more uniform properties is obtained. Great economy is had in floor space necessary for the erection of the machine, supervision of its operation and general cost of its construction. Due to the increased speed and multiple film production, the output is far greater than that obtained from similar machines in the past. The use of the downwardly projecting members at the sides of the hopper results in a wider sheet with more uniform properties.

The long tray machine described eliminates the use of a great number of wet end rollers as at present used in machines of the prior art, thus effecting large savings in power and maintenance as well as initial costs for installing these rollers.

Since it is obvious that many changes and modifications can be made in the details of the above-described method and apparatus, it is to be understood that the invention is not to be limited to the above-mentioned details except as set forth in the appended claims.

I claim:

1. In the production of sheets and films from film-forming compositions coagulable in a liquid coagulating bath, the steps of extruding a film-forming composition, in the form of a sheet, into a passing body of coagulating liquid, forwarding said sheet by means of said moving liquid to a passing body of regenerated liquid, passing the sheet in inverted position through said second body of liquid and forwarding said sheet during said passage by means of said moving liquid.

2. In the production of continuous sheets of regenerated cellulose from viscose, the steps of extruding viscose in the form of a sheet downwardly, allowing the extruded viscose to travel a short distance from the point of extrusion, catching it in a coagulating bath having a downwardly declined plane surface of greater width than the extruded sheet, passing the extruded sheet through said coagulating bath by means of the coagulating liquid, inverting said web, catching it in a second bath having a downwardly declined plane surface of greater width than the extruded sheet, and forwarding the sheet by means of said second bath.

3. The process of claim 2 wherein the speed of the flowing coagulating bath is approximately equal to the speed of extrusion of the sheet.

4. In the production of sheets and films from cellulosic film-forming compositions which may be regenerated in a liquid bath to form regenerated cellulose, the steps of extruding the film-forming composition, in the form of a sheet, into a passing body of regenerating liquid, forwarding said regenerated cellulose sheet by means of said moving liquid to a passing body of regenerated liquid, passing the sheet in inverted position through said second body of liquid and forwarding said sheet during said passage by means of said moving liquid.

5. In the production of sheets and films from film-forming compositions coagulable in a liquid coagulating bath, the steps of extruding a film-forming composition, in the form of a sheet, into a passing body of coagulating liquid, forwarding said sheet by means of said moving liquid, inverting said sheet, passing said sheet into a second passing body of treating liquid, and forwarding said sheet by means of said second moving body of liquid.

6. In the production of sheets and films from film-forming compositions coagulable in a liquid coagulating bath, the steps of extruding a film-forming composition, in the form of a sheet, into a passing body of coagulating liquid, forwarding said sheet by means of said moving liquid, successively passing said sheet into moving bodies of treating liquid, and forwarding said sheet by means of said moving bodies of treating liquid, said sheet being inverted each time it passes from one bath to the next succeeding bath.

7. In the production of sheets and films from cellulosic film-forming compositions which may be regenerated in a liquid bath to form regenerated cellulose, the steps of extruding the film-forming composition, in the form of a sheet, into a passing body of regenerating liquid, forwarding said sheet by means of said moving body of liquid, successively passing said sheet into moving bodies of regenerating, purifying and softening liquids, and forwarding said sheet by means of said successive bodies of liquids, said sheet being inverted each time it passes from one bath to the next succeeding bath.

8. In the production of sheets and films from viscose film-forming compositions, the steps of extruding the viscose, in the form of a sheet, into a passing body of regenerating liquid to form regenerated cellulose sheeting, forwarding said sheeting by means of said moving body of liquid, inverting said sheet and successively passing said sheet into moving bodies of washing, bleaching, desulfuring and softening liquids, and forwarding said sheets by means of said successive bodies of liquids.

9. In the production of sheets and films from film-forming compositions coagulable in a liquid coagulating bath, the steps of extruding a film-forming composition, in the form of a sheet, into a body of a coagulating liquid moving at approximately the same speed as the speed of extrusion, forwarding said sheet by means of said moving liquid to a passing body of regenerated liquid, passing the sheet in inverted position through said second body of liquid and forwarding said sheet during said passage by means of said moving liquid.

10. In the production of sheets and films from film-forming compositions coagulable in a liquid coagulating bath, the steps of extruding a film-forming composition, in the form of a sheet, into a body of a coagulating liquid moving along a downwardly declined plane, forwarding said sheet by means of said liquid, inverting said sheet, passing said inverted sheet into a second body of treating liquid to insure contact of the original top side of the extruded sheet with the treating liquid, said second body, of liquid moving along a downwardly declined plane in a direction opposite the said first-named downwardly declined plane, and forwarding said sheet by means of said second body of treating liquid.

11. In the production of sheets and films from film-forming compositions coagulable in a liquid coagulating bath, the step of extruding a film-forming composition, in the form of a sheet, into a moving body of coagulating liquid, forwarding said sheet by means of said moving liquid, and continuously changing the bath liquid by introducing additional coagulating liquid along the path traveled by the extruded sheet, during its movement, so as to maintain the same at the desired strength.

12. In the production of sheets and films from film-forming compositions coagulable in a liquid coagulating bath, the step of extruding a film-forming composition, in the form of a sheet, into a moving body of coagulating liquid, forwarding said sheet by means of said moving liquid, introducing additional coagulating liquid beneath the surface of the first mentioned liquid along the path traveled by the extruded sheet, during its movement, so as to maintain the same at the desired strength and temperature.

13. In the production of sheets and films from film-forming compositions coagulable in a liquid coagulating bath, the steps of extruding a film-forming composition, in the form of a plurality of superposed sheets, into a passing body of coagulating liquid, and forwarding said sheets by means of said moving liquid.

14. Apparatus for the continuous production of sheets and films from film-forming compositions coagulable in a liquid coagulating bath, means for extruding a film-forming solution in the form of a sheet, a downwardly declined tray under said extruding means, means for passing a coagulating bath along said tray out of contact with said extruding means, the downwardly declining angle of said tray being such that the speed of the bath flowing therein will be approximately equal to the speed of extrusion of said sheet, a second downwardly declined tray, means for passing a bath along said tray, the downwardly declining angle of said second tray being such that the speed of the bath flowing therein will be approximately equal to the speed of extrusion of said sheet, and means for inverting sheet and guiding it from said first declined tray into the bath in said second declined tray.

15. Apparatus for the continuous production of sheets and films from film-forming compositions coagulable in a liquid coagulating bath, means for extruding a film-forming solution in the form of a sheet, a plurality of trays under said extruding means, means for inverting the sheet material at the foot of each tray except the bottom tray, said trays positioned in superposed relationship to each other along oppositely directed downwardly declined planes, means for passing treating liquids along said trays, the downwardly declining angles of the successive trays being such that the speed of the treating liquids flowing therein will be approximately equal to the speed of movement of said sheet.

16. In an apparatus as defined in claim 14, means for maintaining the width of the extruded sheet substantially constant until it contacts the coagulating bath.

17. In an apparatus as defined in claim 14, means for maintaining the strength of the coagulating bath substantially constant along the length of the tray.

18. In an apparatus as defined in claim 14, means for adding and means for withdrawing coagulating bath along the length of the tray.

19. In an apparatus as defined in claim 14, inlet slots for adding and outlet slots for withdrawing coagulating bath along the length of the tray.

20. In an apparatus as defined in claim 14, inlet slots for adding and outlet slots for withdrawing coagulating bath along the length of the tray, and baffles between inlet slots and outlet slots to direct the spent fluid toward the outlet slots.

21. In an apparatus as defined in claim 14, a plurality of means for extruding a plurality of film-forming solutions in the form of a plurality of superposed sheets, into said coagulating bath.

22. The process of making continuous regenerated cellulose webs which comprises extruding viscose in the form of a sheet, downwardly into tangential contact with a declined shallow gravity flow coagulating bath at such a speed that the web formed therein travels at about the same rate as the bath, transporting the web through said bath, inverting the web, passing the inverted web into a second declined shallow gravity flow bath which supports and conveys the web, and thereafter purifying, softening and drying said web.

23. In the production of sheets and films from film-forming compositions coagulable in a liquid coagulating bath, the step of extruding a film-forming composition, in the form of a sheet, into a moving body of coagulating liquid, forwarding said sheet by means of said moving liquid, introducing additional coagulating liquid beneath the surface of the first-mentioned liquid along and beneath the path traveled by the extruded sheet, during its movement, so as to maintain the same at the desired strength and temperature.

24. In the production of sheets and films from film-forming compositions coagulable in a liquid coagulating bath, the step of extruding a film-forming composition, in the form of a sheet, into a downwardly declined moving body of coagulating liquid, forwarding said sheet by means of said moving liquid, and continuously changing the bath liquid by introducing additional coagulating liquid along the path traveled by the extruded sheet during its movement, so as to maintain the same at the desired strength.

WILLIAM BENDER.